United States Patent [19]

Rochat

[11] 4,146,318

[45] Mar. 27, 1979

[54] AUTOMATIC DIAPHRAGM CONTROL

[75] Inventor: Charles L. Rochat, Veyrier, Switzerland

[73] Assignee: Pignons S.A., Ballaigues, Switzerland

[21] Appl. No.: 862,979

[22] Filed: Dec. 21, 1977

[30] Foreign Application Priority Data

Sep. 30, 1977 [CH] Switzerland .................... 11967/77

[51] Int. Cl.² .............................................. G03B 7/08
[52] U.S. Cl. .................................................... 354/43
[58] Field of Search ...................... 354/40, 41, 42, 43, 354/44, 51, 31, 60 R

[56] References Cited

U.S. PATENT DOCUMENTS 4,015,198  3/1977  Imashita et al. ................... 354/43 X Primary Examiner—Michael L. Gellner
Attorney, Agent, or Firm—Emory L. Groff, Jr.

[57] ABSTRACT

A process for controlling the closure of a diaphragm includes measuring the light intensity with the diaphragm fully open and memorizing a value related to the correct diaphragm opening. The diaphragm is then progressively closed while sensing the intantaneous light value. The memorized and instantaneous values are compared to determined proper diaphragm opening.

4 Claims, 1 Drawing Figure

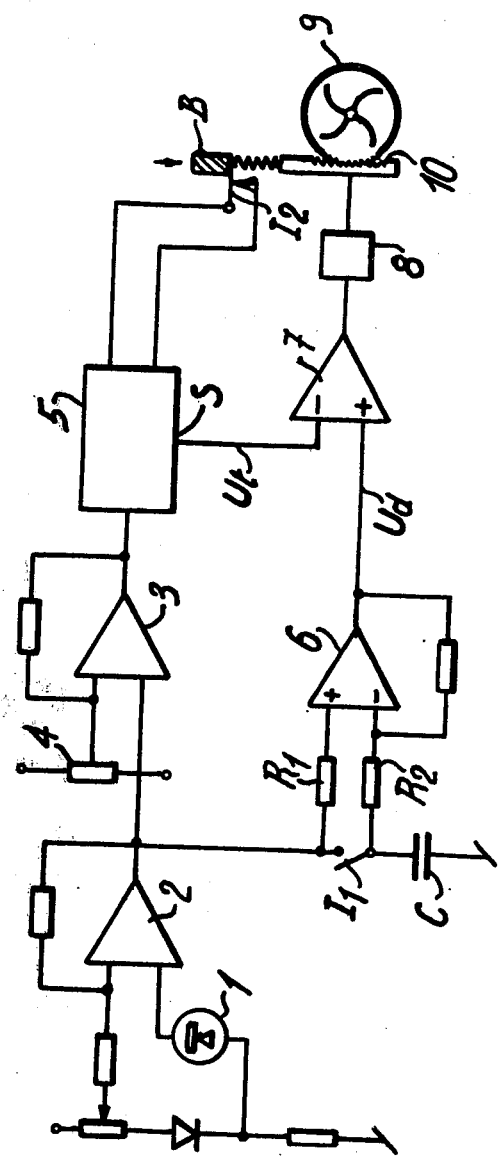

AUTOMATIC DIAPHRAGM CONTROL

This invention relates to a process to control the closure of a diaphragm in a camera, consisting of measuring the intensity of a ray of light through the fully opened diaphragm, and then of calculating an initial representative value of the diaphragm in terms of the intensity measured, a predetermined shutting speed and film sensitivity.

This initial value makes it possible to determine the opening of the diaphragm in terms of the aforementioned parameters, the opening then being controlled by mechanical facilities. As a result of the mechanical dispersions the result obtained frequently does not correspond to the value calculated. This method of proceeding is not therefore very precise, which may cause difficulties and have its effect on the quality of the photographs.

The purpose of this invention is to overcome this lack of precision by controlling the closure of the diaphragm.

The process according to this invention is characterised by the fact that it consists of memorising the said initial value, then of controlling the gradual closure of the diaphragm, of measuring constantly the instantaneous intensity of the ray of light passing through the diaphragm, of determining a second value representative of the instantaneous opening of the diaphragm in terms of the instantaneous intensity, of comparing the first and second values and of stopping closure of the diaphragm as soon as they are equal.

Thanks to the process according to this invention, the final opening of the diaphragm, the opening at which the picture will be taken, no longer depends on a mechanical magnitude, but essentially on the quantity of light passing through the diaphragm and measured continuously to be compared with the quantity of theoretic light corresponding to the selected speed and sensitivity.

The opening of the diaphragm is therefore such that finally it allows passage of a quantity of light equal to the theoretic quantity. It can therefore be seen that the adjustment is far more precise than with purely mechanical controls.

This invention also relates to a device for implementing the process, this device comprising a photo-electric circuit measuring the intensity of the ray of light passing through the fully opened diaphragm, a calculation circuit supplying an initial electrical magnitude representing the degree to which the diaphragm is to be opened in terms of the said intensity, the predetermined shutting speed and film sensitivity, and facilities for the gradual closing of the diaphragm, this device being characterised by the fact that it comprises facilities for memorising this initial magnitude, the photo-electric circuit producing a signal representing the instantaneous opening of the diaphragm in terms of the instantaneous intensity, and a comparing circuit, which compares the intitial magnitude with the said signal and issues a diaphragm blocking control when the said signal reaches a value equal to the initial value.

The attached drawing shows, as an example, a block electrical diagram of an embodiment of the device according to this invention.

This device comprises a photo-electric cell 1 intended to be exposed to the light from an object to be photographed. This cell 1 is connected to the inlet on an amplifier 2. This amplifier 2 is connected to one of the inlets of a differential amplifier 3, the other inlet of which is connected to a potentiometer 4, so as to receive a fixed potential in terms of the sensitivity of the photographic film used. The outlet of this differential amplifier 3 is connected to a photometer 5.

This photometer 5 is of a well known type which is not described in detail here. It is designed so as to determine by calculation the opening which a diaphragm must have in terms of a predetermined shutting speed and the signal supplied by differential amplifier 3, this signal itself depending on the intensity of the ray of light measured by cell 1 and the sensitivity of the film fixed by potentiometer 4.

The process of calculating the necessary diaphragm closure starts as soon as a order reaches photometer 5, this order being given, in the example described here, by the closure of a contact 12 activated by a button B. The result of the calculation appears in the form of an electrical signal Ut at one of the outlets S of photometer 5. The voltage of this signal is an indication of the degree of closure of the diaphragm. The lower the voltage, the more the diaphragm must be shut.

The outlet of amplifier 2 is then connected, through a resistor R1, to one of the inlets of differential amplifier 6. The other inlet is connected to ground through a resistor R2 and a capacitor C. The switch I1 makes it possible to connect these two inlets through the two resistors R1 and R2.

The outlet of differential amplifier 6 is connected to one of the inlets of a comparator 7, the other inlet of this comparator receiving the signal issued by a photometer 5 at its outlet S. The outlet of comparator 7 is connected to an electromagnet 8 which controls the blocking of an iris diaphragm 9.

The closure of diaphragm is also controlled by a button B. After the latter has controlled closure of contact I2 and if it continues to be operated, it causes closure of the diaphragm through a mechanical control 10 which is activated by electromagnet 8 to block the diaphragm.

The operation of the circuit is described below:

Initially, that is to say when there is no desire to take a picture, switch I1 is closed, so that the output voltage of differential amplifier 6 is constant, contact I2 is open, so that photometer 5 is not operating and diaphragm 9 is completely open.

If we wish to bring about an opening of the diaphragm to take a picture, then initially button B is pressed until contact I2 closes. Photometer 5 calculates the diaphragm required in terms of the quantity of light received by cell 1 through the completely opened diaphragm. This value therefore appears in the form of an electrical signal at outlet S of photometer 5.

Switch I1 being shut, capacitor C charges at a voltage Uc representing the quantity of light measured with the full opening, therefore corresponding to a completely open diaphragm. This will be the reference voltage.

If we continue to press button B, then in a second stage this will control the opening of switch I1, so that differential amplifier 6 receives at one of the inlets the reference voltage and at the other inlet a voltage varying with the variation in light intensity measured by cell 1 through the diaphragm, this voltage obviously being equal to the reference voltage, as long as the diaphragm remains fully opened.

In this embodiment, the output voltage of differential amplifier 6 is initially equal to the reference voltage multiplied by the gain of amplifier 6.

If we then continue to press button B, the diaphragm will close gradually, The intensity of the ray of light passing through it and striking cell 1 will diminish, the voltage at the outlet of amplifier 2 also diminishes, and voltage Ud at the outlet of differential amplifier 6. This last voltage Ud is a precise indication of the instantaneous degree of closure of the diaphragm. When this voltage Ud is equal to the voltage Ut from photometer 5, comparator 7 excites electro-magnet 8 which controls blockage of the diaphragm. Control of the taking of pictures can then be effected by any well known means, for example by again pressing button B even further down.

This manner of proceeding makes it possible to obtain a diaphragm opening effectively allowing the passage of a quantity of light equal to the theoretic quantity calculated by photometer 5.

By virtue of bringing the diaphragm under the control of the quantity of light, the tolerances due to the mechanics no longer intervene, provided the response time of the electromagnet is very short, in order to stop mechanical control 10 immediately.

In the device described, it is interesting to note that the user may take as many measurements as he likes whithout having to control closure of the diaphragm each time. In fact, the first time described above may be repeated as many times as required without switch I1 being open or mechanism 10 operated. Calculation of the necessary diaphragm in terms of all the parameters mentioned is effected on each closure of contact I2, and as long as contact I2 is closed, voltage Ut is present at outlet S of photometer 5.

In a variant, photometer 5 could be designed so as to allow preselection of the diaphragm, the speed then being calculated in terms of the light and sensitivity of the film. The signal Ut appearing at the inlet of comparator 7 would then correspond to the preselected value and slaving would be effected in the same way as described above.

It is obvious that the diaphragm and /or the shutting speed may be determined by other well known facilities, the essential factor being to have this reference signal Ut corresponding to a certain quantity of light which finally the diaphragm must allow to pass through.

The closure of the diaphragm could be controlled by other means than those described above, for example by a motor. The principles of operation remain and when the voltage $U_d$ is equal to the voltage $U_t$, the signal emitted by comparator 7 is used to stop the motor and thus the closure of the diaphragm.

I claim:

1. Process for controlling the closure of a diaphragm in a camera, consisting of measuring the intensity of a ray of light passing through this fully opened diaphragm, then of fixing an intitial value representing the opening which the diaphragm must have and memorising the said initial value, then of controlling gradual closure of the diaphragm, then a measuring constantly the instantaneous intensity of the ray of light passing through the diaphragm, of determining a second value representing the instantaneous opening of the diaphragm in terms of the instantaneous intensity, of comparing the first and second values, and of stopping closure of the diaphragm as soon as they are equal.

2. Process in accordance with claim 1, in which the first value is determined by comparison with the intensity measured with the diaphragm fully open and a second value is determined by the difference between the intensity measured with the diaphragm fully opened and the instantaneous intensity measured during closure of the diaphragm.

3. Device for controlling the opening of a diaphragm in a camera comprising a photo-electric circuit measuring the intensity of the ray of light passing through the fully open diaphragm, facilities supplying a first electrical value representing the opening the diaphragm must have, a facilities for gradually closing the diaphragm, facilities for memorising this first value, a photo-electric circuit producing a signal representing the instantaneous opening of the diaphragm in terms of the instantaneous intensity, and a comparing circuit comparing the first value with the said signal and issuing a signal to control blockage of the diaphragm when the said signal reaches a value equal to the first value.

4. Device in accordance with claim 3, comprising a memory for the first value representing the intensity measured with the diaphragm fully open, the outlet of this memory being connected to one inlet of a differential amplifier, the other inlet of which receives the signal representing the instantaneous intensity, the outlet of this differential amplifier being connected to a comparator.

* * * * *